United States Patent
Caretta et al.

(10) Patent No.: US 8,386,153 B2
(45) Date of Patent: Feb. 26, 2013

(54) INTERNAL COMBUSTION ENGINE AND METHOD AND DEVICE FOR OPERATING AN INTERNAL COMBUSTION ENGINE

(75) Inventors: Gianluca Caretta, Regensburg (DE); Manfred Weigl, Viehhausen (DE)

(73) Assignee: Continental Automotive GmbH, Hannover (DE)

( * ) Notice: Subject to any disclaimer, the term of this patent is extended or adjusted under 35 U.S.C. 154(b) by 130 days.

(21) Appl. No.: 12/667,638

(22) PCT Filed: Jun. 4, 2008

(86) PCT No.: PCT/EP2008/056862
§ 371 (c)(1),
(2), (4) Date: Jan. 4, 2010

(87) PCT Pub. No.: WO2009/003779
PCT Pub. Date: Jan. 8, 2009

(65) Prior Publication Data
US 2010/0179746 A1      Jul. 15, 2010

(30) Foreign Application Priority Data
Jul. 3, 2007   (DE) .................. 10 2007 030 837

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| G06F 11/30 | (2006.01) |
| F02B 47/08 | (2006.01) |
| F02M 25/07 | (2006.01) |
| G01M 15/00 | (2006.01) |
| G21C 17/00 | (2006.01) |

(52) U.S. Cl. .............. 701/108; 123/568.16; 123/568.21; 701/109; 73/114.74; 702/182
(58) Field of Classification Search .................. 701/108, 701/103, 109; 123/568.16, 568.11, 568.12, 123/568.21
See application file for complete search history.

(56) References Cited

U.S. PATENT DOCUMENTS

| 5,430,428 | A | 7/1995 | Gerblinger et al. |
| 2003/0041845 | A1 | 3/2003 | Akao et al. |
| 2004/0182373 | A1 | 9/2004 | Li et al. |
| 2006/0169246 | A1* | 8/2006 | Asai .............................. 123/305 |

FOREIGN PATENT DOCUMENTS

| DE | 102006042874 | 3/2008 |
| EP | 0571412 | 5/1998 |

(Continued)

*Primary Examiner* — Stephen K Cronin
*Assistant Examiner* — Sherman Manley
(74) *Attorney, Agent, or Firm* — Cozen O'Connor

(57) ABSTRACT

An internal combustion engine includes at least two cylinders, an intake duct, an exhaust gas section and an exhaust gas recirculation line. The cylinders include a combustion chamber. The intake duct communicates with the combustion chambers via a cylinder inlet channel of the intake duct depending upon a switch position of a gas inlet valve. The exhaust gas section communicates with the combustion chambers depending upon a switch position of at least one gas outlet valve. Exhaust gas is guided back to the inlet channels via the exhaust gas recirculation line dependent upon a switch position of the exhaust gas recirculation valve. To detect a mixing air temperature in the inlet channels, a mixing air temperature sensor is provided. The determined mixing air temperatures are compared. Exhaust gas guided back due to uneven distribution is identified if a difference between the determined mixing air temperature is greater than a predetermined threshold value.

6 Claims, 1 Drawing Sheet

FOREIGN PATENT DOCUMENTS

| | | |
|---|---|---|
| EP | 1288469 | 3/2003 |
| FR | 2901312 | 11/2007 |
| FR | 2907506 | 4/2008 |
| JP | 200690170 | 4/2006 |
| JP | 2006090170 A * | 4/2006 |
| JP | 2010106846 A * | 5/2010 |

* cited by examiner

INTERNAL COMBUSTION ENGINE AND METHOD AND DEVICE FOR OPERATING AN INTERNAL COMBUSTION ENGINE

PRIORITY CLAIM

This is a U.S. national stage of application No. PCT/EP2008/056862, filed on Jun. 4, 2008, which claims priority to the German Application No.: 10 2007 030 837.1, filed: Jul. 3, 2007; the content of both incorporated herein by reference.

BACKGROUND OF THE INVENTION

1. Field of the Invention

The invention relates to an internal combustion engine having at least two cylinders which comprise in each case one combustion chamber. The internal combustion engine also comprises an intake duct, an exhaust section, and an exhaust-gas recirculation line. The intake duct communicates via a respective cylinder inlet channel of the intake duct with a respective one of the combustion chambers as a function of a switching position of in each case at least one gas inlet valve. The exhaust section communicates with in each case one of the combustion chambers as a function of a switching position of at least one respective gas outlet valve. Via the exhaust-gas recirculation line, exhaust gas can be recirculated from the exhaust section to the inlet channels of the intake duct as a function of a switching position of an exhaust-gas recirculation valve. The invention also relates to a method and a device for operating an internal combustion engine.

2. Prior Art

Pollutant emissions of an internal combustion engine can be reduced in predefined operating states of the internal combustion engine by recirculating exhaust gas and by supplying the exhaust gas for renewed combustion. Due to the recirculation of the exhaust gas, combustion temperature is reduced. In this way, fewer pollutants are formed during the combustion process in relation to the pollutant production without recirculation of the exhaust gas.

SUMMARY OF THE INVENTION

An object of the invention is creating an internal combustion engine and a method and a device for operating an internal combustion engine which enable cylinder-specific checking of an exhaust-gas recirculation.

According to a first embodiment of the invention, the invention is characterized by an internal combustion engine. The internal combustion engine comprises at least two cylinders, an intake duct, an exhaust section and an exhaust-gas recirculation line. The cylinders each comprise one combustion chamber. The intake duct communicates via in each case one cylinder inlet channel of the intake duct with in each case one of the combustion chambers as a function of a switching position of in each case at least one gas inlet valve. The exhaust section communicates with in each case one of the combustion chambers as a function of a switching position of in each case at least one gas outlet valve. Via the exhaust-gas recirculation line, exhaust gas can be recirculated from the exhaust section to the inlet channels of the intake duct as a function of a switching position of an exhaust-gas recirculation valve. The internal combustion engine has in each case one mixed-air temperature sensor for measuring in each case one mixed-air temperature in the inlet channels.

The mixed-air temperature sensors in the inlet channels enable a cylinder-specific measurement of the mixed-air temperature. The mixed air is composed of recirculated exhaust gas from the exhaust section and of fresh air which has been drawn in via the intake duct. The mixed-air temperature is a combination of the exhaust-gas temperature of the recirculated exhaust gas and the fresh-air temperature of the drawn-in fresh air. The measurement of the mixed-air temperatures makes it possible to check whether the recirculated exhaust gas is distributed uniformly between the individual cylinders. This therefore enables a cylinder-specific check of the exhaust-gas recirculation.

In one embodiment of the invention, the mixed-air temperature sensors have a response time of less than 100 milliseconds. This makes it possible to measure the mixed-air temperatures resulting from the exhaust-gas recirculation in a particularly precise manner. The response time is the time period required for one of the mixed-air temperature sensors to deliver a precise measurement result after an abrupt temperature change.

According to another embodiment of the invention, the invention is characterized by a method and a device for operating an internal combustion engine. The internal combustion engine comprises at least two cylinders, an intake duct, an exhaust section and an exhaust-gas recirculation line. The cylinders each comprise a respective combustion chamber. The intake duct communicates via in each case one cylinder inlet channel of the intake duct with in each case one of the combustion chambers as a function of a switching position of in each case at least one gas inlet valve. The exhaust section communicates with one of the combustion chambers as a function of a switching position of in each case at least one gas outlet valve. Via the exhaust-gas recirculation line, exhaust gas can be recirculated from the exhaust section to the inlet channels of the intake duct as a function of a switching position of an exhaust-gas recirculation valve. For the operation of the internal combustion engine, in each case one mixed-air temperature is determined in at least two cylinder inlet channels. The determined mixed-air temperatures are compared. An uneven distribution of recirculated exhaust gas is detected if a difference between the determined mixed-air temperatures is greater than a predefined threshold value.

This enables the cylinder-specific checking of the exhaust-gas recirculation. The mixed-air temperatures can be determined by means of the mixed-air temperature sensors.

In one embodiment of the invention, the threshold value is predefined as a function of a load, a cooling water temperature and/or a rotational speed of the internal combustion engine. This makes it possible, in the assessment of the uneven distribution of the recirculated exhaust gas, to take into consideration an uneven distribution of the recirculated exhaust gas which is dependent on the operating state predefined by the load, the cooling water temperature and/or the rotational speed. This helps to ensure that an uneven distribution of the recirculated exhaust gas is not inferred unnecessarily.

In a further embodiment of the invention, in a predefined operating state of the internal combustion engine, at least one corrective value is determined such that the mixed-air temperatures determined in the predefined operating state are aligned with one another taking into consideration the corrective value. In this context, the predefined operating state may be for example when the internal combustion engine is at a standstill or an operating state in which no exhaust gas is recirculated.

BRIEF DESCRIPTION OF DRAWINGS

Exemplary embodiments of the invention are explained in more detail below on the basis of schematic drawings, in which.

DETAILED DESCRIPTION OF THE DRAWINGS

Figure 1:
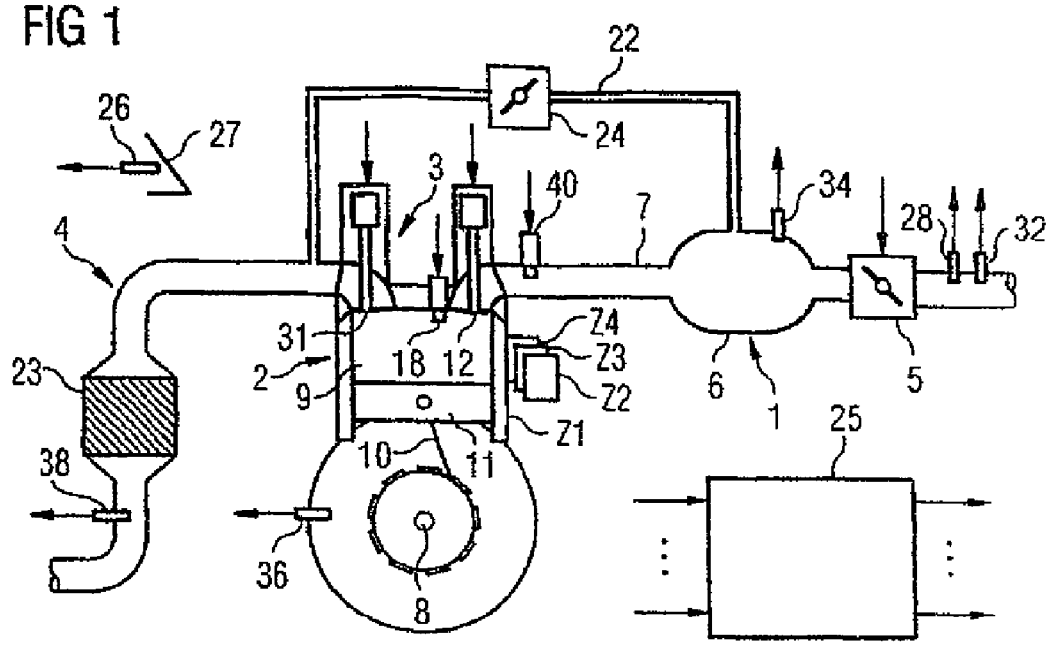
FIG. 1 is an internal combustion engine.

Elements of the same design or function are denoted throughout the figures by the same reference numerals.

An internal combustion engine is shown in FIG. 1, and comprises an intake duct 1, an exhaust section 4, an engine block 2 and at least two, preferably a plurality of cylinders Z1-Z4 with in each case one cylinder head 3 and in each case one combustion chamber 9. The intake duct 1 preferably comprises a throttle flap 5, a collector 6 and cylinder inlet channel 7 which leads to respective combustion chambers 9 of the engine block 2. The intake duct 1 communicates with one of the combustion chambers 9 as a function of a switching position of a gas inlet valve 12. The exhaust section 4 communicates with one of the combustion chambers 9 as a function of a switching position of a gas outlet valve 31. The engine block 2 comprises a crankshaft 8 which is coupled via a connecting rod 10 to the piston 11 of the cylinder Z1-Z4. The internal combustion engine may however also have any desired greater number of cylinders Z1-Z4. The internal combustion engine is preferably a diesel internal combustion engine or a lean-running spark-ignition engine with direct injection, and is preferably arranged in a motor vehicle.

A fuel injection valve 18 is preferably arranged in the cylinder head 3. Alternatively, the fuel injection valve 18 may also be arranged in the cylinder inlet channel 7. If the internal combustion engine is operated with gasoline, then a spark plug is preferably arranged in the cylinder head 3.

An exhaust-gas catalytic converter 23 is arranged in the exhaust section 4. The exhaust section 4 communicates with the intake duct 1 via an exhaust-gas recirculation line 22 as a function of a switching position of an exhaust-gas recirculation valve 24. Exhaust gas can be recirculated from the exhaust section 4 into the intake duct 1 through the exhaust-gas recirculation line 22. Here, an exhaust-gas recirculation rate can be predefined by the exhaust-gas recirculation valve 24.

A control device 25 is provided which is assigned sensors which measure different measurement variables and which determine, in each case, the value of the measurement variable. Operating variables encompass the measurement variables, and variables derived therefrom, of the internal combustion engine. Operating variables may be representative of a present operating state of the internal combustion engine. The present operating state of the internal combustion engine may encompass many operating points of the internal combustion engine. The control device 25 determines, as a function of at least one of the operating variables, at least one actuating variable which is then converted into one or more actuating signals for controlling the actuating elements by corresponding actuating drives. The control device 25 may also be referred to as a device for operating the internal combustion engine.

The sensors are for example a pedal position transducer 26, which measures a throttle pedal position of a throttle pedal 27, an air mass sensor 28 which measures an air mass flow upstream of the throttle flap 5, an intake air temperature sensor 32 which measures an intake air temperature, a suction pipe pressure sensor 34 which measures a suction pipe pressure in the collector 6, a crankshaft angle sensor 36 which measures a crankshaft angle which is then assigned a rotational speed of the internal combustion engine, an exhaust-gas probe 38 which is arranged downstream of the exhaust-gas catalytic converter 23 and the measurement signal of which is representative of an air/fuel ratio of the exhaust gas, and in each cylinder inlet channel 7, in each case one mixed-air temperature sensor 40 for measuring in each case one mixed-air temperature in the corresponding cylinder inlet channel 7, in particular for measuring a first mixed-air temperature $T\_CYL\_1$ and a second mixed-air temperature $T\_CYL\_2$.

Depending on the embodiment of the invention, any desired subset of said sensors may be provided, or additional sensors may also be provided.

The actuating elements are for example the throttle flap 5, the gas inlet and gas outlet valves 12, 13, the fuel injection valve 18 and/or the exhaust-gas recirculation valve 24 and if appropriate the spark plug.

In a lean mode of the internal combustion engine, less fuel is metered for a combustion process in the combustion chamber 9 than can be burned with the oxygen in the combustion chamber 9. In this way, more nitrogen oxides are produced than in a rich mode and/or a stoichiometric mode of the internal combustion engine, which nitrogen oxides are then contained in the exhaust gas. The nitrogen oxides are harmful to the environment and to health. By recirculating exhaust gas from the exhaust section 4 to the intake duct 1, the exhaust gas forms mixed air with the drawn-in fresh air. The mixed air is supplied to the combustion process. In this way, a combustion temperature of the combustion process is reduced. This can contribute to a reduction in nitrogen oxide production during the combustion process. Furthermore, the recirculation of the exhaust gas can reduce fuel consumption of the internal combustion engine.

Figure 2:
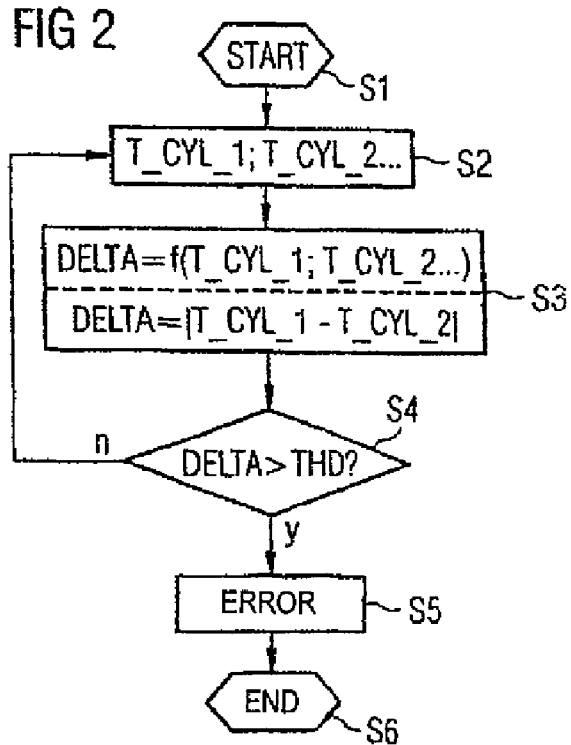
FIG. 2 is a flow diagram of a program for operating the internal combustion engine.

A storage medium of the control device 25 preferably has stored on it a program whose steps are shown in FIG. 2 for operating the internal combustion engine. The program serves for checking the exhaust-gas recirculation, in particular for checking a uniform distribution of the recirculated exhaust gas between the individual cylinders Z1-Z4, in particular between the individual combustion chambers 9. The exhaust gas may be distributed unevenly between the individual cylinders Z1-Z4 for example on account of the design of the intake duct and/or on account of occurrences of wear in the intake duct.

The program is started, preferably in an operating state in which exhaust gas is recirculated, in a step S1 in which variables are initialized if appropriate.

In a step S2, in each inlet channel 7 of each cylinder Z1-Z4, in each case one of the mixed-air temperatures, in particular the first mixed-air temperature $T\_CYL\_1$ of the first inlet channel and the second mixed-air temperature $T\_CYL\_2$ of the second inlet channel, are determined. The first mixed-air temperature $T\_CYL\_1$ is preferably assigned to the first cylinder Z1 and the second mixed-air temperature $T\_CYL\_2$ is preferably assigned to the second cylinder Z2. The mixed-air temperatures are preferably determined for each of the cylinders Z1 to Z4. An overall mixed-air temperature is representative of an exhaust-gas recirculation rate since the recirculated exhaust gas has an effect on the overall mixed-air temperature. The overall mixed-air temperature results from the individual mixed-air temperatures, in particular from the first and the second mixed-air temperatures $T\_CYL\_1$, $T\_CYL\_2$.

In a step S3, a difference DELTA between the determined mixed-air temperatures, in particular between the first and the second mixed-air temperatures $T\_CYL\_1$, $T\_CYL\_2$, is determined, preferably using the calculation rule specified in step S3. If more than two mixed-air temperatures are measured, these may for example be compared with one another in pairs. If two or more of said mixed-air temperatures are approximately equal, then these mixed-air temperatures can serve as reference values for comparison with the other mixed-air temperatures.

In a step S4, it is checked whether the difference DELTA is greater than a predefined threshold value THD. The threshold value THD may for example be fixedly predefined. It is however preferable for the threshold value THD to be predefined as a function of a load, a cooling water temperature and/or the rotational speed of the internal combustion engine. This allows for the fact that the uneven distribution of the recirculated exhaust gas can have different effects, and can therefore be more or less critical, at different operating points which are characterized by the load, the cooling water temperature and/or the rotational speed. If the condition of step S4 is not met, then the process is resumed again in step S2. If the condition of step S4 is met, then the process is resumed in a step S5.

In the step S5, an error message ERROR is generated which is representative of the uneven distribution of the recirculated exhaust gas. The error message ERROR may for example be displayed to a driver of the motor vehicle by the illumination of an engine control lamp. Alternatively or in addition, a fault entry may be stored in a fault memory of the control device 25 as a function of the error message ERROR. Furthermore, one or more safety measures may be implemented as a function of the error message ERROR. For example, the cylinder Z1-Z4 to which too little exhaust gas is being recirculated may be operated in such a way that its nitrogen oxide emissions are preferably as low as possible despite the excessively low cylinder-specific exhaust-gas recirculation rate, for example at the expense of power or running smoothness. For example, in the corresponding cylinder Z1-Z4, a metering time of the fuel may be shifted in the late direction in relation to the crankshaft angle, and/or an injection mass for the corresponding cylinder Z1-Z4 may be reduced.

In a step S6, the program for operating the internal combustion engine may be ended. The program is however preferably carried out at regular intervals during the operation of the internal combustion engine, in particular during the recirculation of the exhaust gas.

A function of the mixed-air temperature sensors 40 can be checked in a predefined operating state. The predefined operating state encompasses, for example, when the internal combustion engine is at a standstill or an operating state in which no exhaust gas is recirculated. Then, if the mixed-air temperature sensors 40 are functioning correctly, each of the mixed-air temperature sensors 40 should generate approximately the same measurement value. If, in the predefined operating state, a measurement value of one of the mixed-air temperature sensors 40 differs from the measurement values of the other mixed-air temperature sensors 40 by more than a predefined value, this can be compensated by determining a corrective value for the corresponding mixed-air temperature sensor 40. In the predefined operating state, all the measurement values of the mixed-air temperature sensors 40 then lead, taking into consideration the determined corrective value, to approximately the same mixed-air temperatures. Here, depending on the corrective value, the corresponding measurement value of the corresponding mixed-air temperature sensor 40 may then be varied. For example, a measurement value offset may basically be added to or subtracted from the corresponding measurement value. Alternatively, the corrective value may be taken into consideration in the evaluation of the corresponding measurement values. For example, a temperature offset may be added to or subtracted from the mixed-air temperature which is determined as a function of the corresponding measurement value.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an internal combustion engine comprising:
    at least two cylinders each having a respective combustion chamber;
    at least one gas inlet valve;
    an intake duct fluidically coupled with the each of the respective combustion chambers via a respective cylinder inlet channel based at least in part on a switching position of the at least one gas inlet valve;
    at least one gas outlet valve;
    an exhaust section fluidically coupled with the each of the respective combustion chambers based at least in part on a switching position of the at least one gas outlet valve;
    an exhaust-gas recirculation valve; and
    an exhaust-gas recirculation line configured to recirculate exhaust gas from the exhaust section to the respective inlet channels based at least in part on a switching position of the exhaust-gas recirculation valve,
    the method comprising:
    measuring a temperature at each respective inlet duct when the exhaust-gas recirculation valve is in a closed position;
    determining a measurement offset for each respective inlet based on the measured temperature at each respective inlet duct;
    determining mixed-air temperatures in at least two of the respective cylinder inlet channels when the exhaust-gas recirculation valve is in an open position;
    one of adding and subtracting the determined measurement offset from at least one of the determined mixed-air temperatures to normalize the determined mixed-air temperatures in at least two of the respective cylinder inlet channels based on the measurement offset;
    comparing the at least two normalized determined mixed-air temperatures; and
    detecting an uneven distribution of recirculated exhaust gas if a difference between the normalized mixed-air temperatures of the at least two of the respective cylinder inlet channels is greater than a predetermined threshold value.

2. The method as claimed in claim 1, wherein the threshold value is predefined as a function of at least one of a load, a cooling water temperature and a rotational speed of the internal combustion engine.

3. The method as claimed in claim 1, further comprising:
determining at least one corrective value for a predefined operating state of the internal combustion engine; and
aligning the determined mixed-air temperatures of the at least two of the respective cylinder inlet channels with one another in the predefined operating state based at least in part on the corrective value.

4. A device for operating an internal combustion engine comprising:
at least two cylinders each having a respective combustion chamber;
at least one gas inlet valve;
an intake duct fluidically coupled with the each of the respective combustion chambers via a respective cylinder inlet channel based at least in part on a switching position of the at least one gas inlet valve;
at least one gas outlet valve;
an exhaust section fluidically coupled with the each of the respective combustion chambers based at least in part on a switching position of the at least one gas outlet valve;
an exhaust-gas recirculation valve; and
an exhaust-gas recirculation line configured to recirculate exhaust gas from the exhaust section to the respective inlet channels based at least in part on a switching position of the exhaust-gas recirculation valve,
the device configured to:
determine a measurement offset for each respective inlet based on a measured temperature at each respective inlet duct when the exhaust-gas recirculation valve is in a closed position;
determine mixed-air temperatures in at least two of the respective cylinder inlet channels; when the exhaust-gas recirculation valve is in an open position;
one of adding and subtracting the determined measurement offset from at least one of the determined mixed-air temperatures to
normalize the determined mixed-air temperatures in at least two of the respective cylinder inlet channels based on the measurement offset; and
detect an uneven distribution of recirculated exhaust gas if a difference between the normalized mixed-air temperatures of the at least two of the respective cylinder inlet channels is greater than a predetermined threshold value.

5. The device as claimed in claim 4, further configured to:
determine at least one corrective value for a predefined operating state of the internal combustion engine; and
align the determined mixed-air temperatures of the at least two of the respective cylinder inlet channels with one another in the predefined operating state based at least in part on the corrective value.

6. The method as claimed in claim 2, further comprising:
determining at least one corrective value for a predefined operating state of the internal combustion engine; and
aligning the determined mixed-air temperatures of the at least two of the respective cylinder inlet channels with one another in the predefined operating state based at least in part on the corrective value.

* * * * *